(12) United States Patent
Varney et al.

(10) Patent No.: US 9,797,263 B2
(45) Date of Patent: Oct. 24, 2017

(54) MONOLITHIC CERAMIC RODS TO ENABLE COOLING HOLES IN CMC

(71) Applicants: Rolls-Royce Corporation, Indianapolis, IN (US); Rolls-Royce North American Technologies, Inc., Indianapolis, IN (US)

(72) Inventors: Bruce Edward Varney, Greenwood, IN (US); Ted Joseph Freeman, Danville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 212 days.

(21) Appl. No.: 14/722,093

(22) Filed: May 26, 2015

(65) Prior Publication Data

US 2016/0348515 A1    Dec. 1, 2016

(51) Int. Cl.

| | |
|---|---|
| *F01D 5/28* | (2006.01) |
| *B23B 37/00* | (2006.01) |
| *B23K 26/382* | (2014.01) |
| *B23K 26/402* | (2014.01) |
| *B23B 35/00* | (2006.01) |
| *C04B 35/00* | (2006.01) |
| *F01D 5/18* | (2006.01) |
| *F01D 9/06* | (2006.01) |

(Continued)

(52) U.S. Cl.
CPC ............ *F01D 5/284* (2013.01); *B23B 35/00* (2013.01); *B23B 37/00* (2013.01); *B23K 26/389* (2015.10); *B23K 26/402* (2013.01); *C04B 35/00* (2013.01); *F01D 5/186* (2013.01); *F01D 5/282* (2013.01); *F01D 9/065* (2013.01); *B23B 2226/18* (2013.01); *B23B 2226/27* (2013.01); *B23K 2203/172* (2015.10); *B32B 3/266* (2013.01); *F05D 2230/10* (2013.01); *F05D 2230/12* (2013.01); *F05D 2230/13* (2013.01); *F05D 2230/61* (2013.01); *F05D 2240/11* (2013.01); *F05D 2240/81* (2013.01); *F05D 2260/202* (2013.01); *F05D 2300/6033* (2013.01)

(58) Field of Classification Search
CPC .......... F01D 5/284; F01D 5/186; F01D 5/282; F01D 9/065; C04B 35/00; B23B 35/00; B23B 37/00; B23K 26/402; B23K 26/389
See application file for complete search history.

(56) References Cited

U.S. PATENT DOCUMENTS

| | | |
|---|---|---|
| 5,344,690 A | 9/1994 | White et al. |
| 6,325,593 B1 | 12/2001 | Darkins, Jr. et al. |
| 6,441,341 B1 | 8/2002 | Steibel et al. |

(Continued)

*Primary Examiner* — Moshe Wilensky
(74) *Attorney, Agent, or Firm* — Brinks Gilson & Lione

(57) ABSTRACT

A method to form a hole in a ceramic matrix composite component may be provided. A monolithic rod may be inserted into a porous ceramic preform. The ceramic preform may be formed into a ceramic matrix composite body that includes the monolithic rod. A portion of the monolithic rod may be removed, leaving a remaining portion in the ceramic matrix composite body. The remaining portion may include walls that define the opening in the ceramic matrix composite body. Alternatively or in addition, a ceramic matrix composite component may be provided. The ceramic matrix composite component may comprise a ceramic matrix composite body that includes a portion of a monolithic rod. The portion of the monolithic rod forms a lining around a hole passing partly or entirely through a length of the monolithic rod.

19 Claims, 5 Drawing Sheets

(51) Int. Cl.
  *B23K 103/16*  (2006.01)
  *B32B 3/26*  (2006.01)

(56) References Cited

U.S. PATENT DOCUMENTS

| | | |
|---|---|---|
| 7,153,464 B2 | 12/2006 | Millard et al. |
| 7,332,116 B2 | 2/2008 | Petervary et al. |
| 7,704,596 B2 | 4/2010 | Merrill et al. |
| 7,837,925 B2 | 11/2010 | Le Clere |
| 8,057,880 B2 | 11/2011 | Petervary et al. |
| 8,597,764 B2 | 12/2013 | Kato et al. |
| 2007/0196693 A1 | 8/2007 | Steibel et al. |
| 2011/0158820 A1 | 6/2011 | Chamberlain et al. |
| 2014/0120308 A1 | 5/2014 | Lin et al. |
| 2014/0271153 A1 | 9/2014 | Uskert et al. |
| 2016/0047549 A1 | 2/2016 | Landwehr et al. |

US 9,797,263 B2

MONOLITHIC CERAMIC RODS TO ENABLE COOLING HOLES IN CMC

TECHNICAL FIELD

This disclosure relates to ceramic matrix composite (CMC) components and, in particular, to opening or holes in CMC components.

BACKGROUND

Present approaches to forming holes in ceramic matrix composite components for use in high temperature and high pressure environments suffer from a variety of drawbacks, limitations, and disadvantages. There is a need for the inventive ceramic matrix composite components, apparatuses, systems and methods disclosed herein.

BRIEF SUMMARY

A method to form a hole in a ceramic matrix composite component may be provided. A monolithic rod may be inserted into a porous ceramic preform comprising multiple ceramic fibers. The ceramic preform may be formed into a ceramic matrix composite body, where the ceramic matrix composite body includes the monolithic rod. A first portion of the monolithic rod may be removed, where a second portion of the monolithic rod may remain in the ceramic matrix composite body after the first portion is removed, and the second portion includes walls that define an opening in the ceramic matrix composite body.

A ceramic matrix composite component may be provided. The ceramic matrix composite component may comprise a ceramic matrix composite body that includes a portion of a monolithic rod. The portion of the monolithic rod forms a lining around a hole passing partly or entirely through a length of the monolithic rod.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Ceramic matrix composite (CMC) components in a hot section of a gas turbine engine may be un-cooled or cooled by forcing air into an inner portion of a CMC component when an outer portion of the CMC component is subject to high heat. Including relatively small holes in the CMC component may increase the cooling effectiveness, facilitating use of the CMC component in combustion liners, turbine blades, turbine vanes, or other parts subjected to intense heat and/or pressure.

However, machining cooling holes in the CMC component may result in cut fibers of the CMC component and expose a surface which is unprotected by an environmental barrier coating. The cut fibers and/or lack of the environmental barrier coating may result in a weakened portion of the CMC component that is subject to environmental attacks, such as oxidation. Moreover, the weakened portion of the CMC component may be right where stresses are the highest due to stress concentrations on or around the hole.

While methods for forming the cooling holes in situ may address the issue of cut fibers, the methods may still leave an unprotected surface in the hole. In addition, applying an environmental barrier coating to the CMC component having holes formed in situ may inadvertently plug the holes with the material of the environmental barrier coating.

In one example to address these problems, a monolithic rod may be inserted into a porous ceramic preform comprising multiple ceramic fibers. The ceramic preform may be formed into a ceramic matrix composite body, where the monolithic rod is embedded in the ceramic matrix composite body. A first portion of the monolithic rod may be removed, by drilling for example, leaving a second portion of the monolithic rod in the ceramic matrix composite body. The second portion may be a hollow tube, for example, that include walls that define a hole in the ceramic matrix composite body. The first portion of the monolithic rod may be removed after component forming, for example, and prior to, during or after component machining. In another example, the first portion of the monolithic rod may be removed before component forming.

The result may be a cooling hole through the CMC component. The cooling hole may not necessarily compromise the integrity of the ceramic fibers, because the ceramic fibers may flow around the hole instead of being cut at the hole. If the monolithic rod comprises an environmental barrier coating (EBC) material, then the material around the cooling hole, which is from the remaining portion of the monolithic rod, is the EBC material and limit an environmental attack on material adjacent to the hole.

Figure 1:
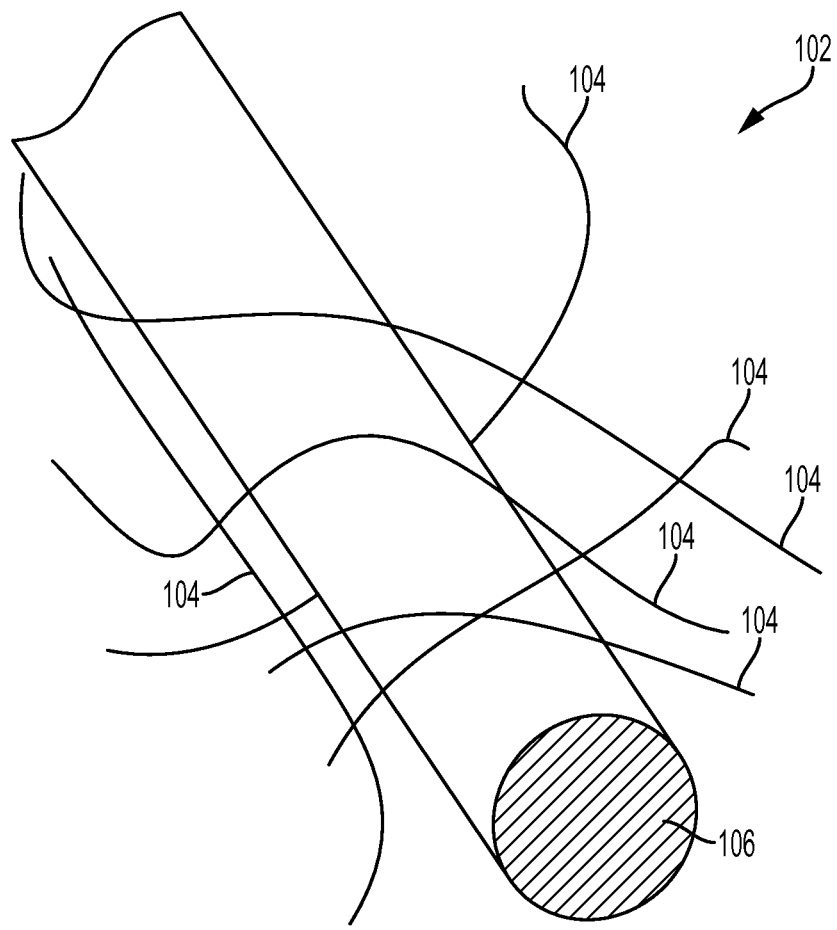
FIG. 1 illustrates a perspective view of a ceramic preform that includes ceramic fibers and a monolithic rod.

FIG. 1 illustrates an example of a ceramic preform 102 that includes ceramic fibers 104 and a monolithic rod 106. The ceramic preform 102 may be an arrangement of the ceramic fibers 104. The arrangement may be fixed in a desired shape. The ceramic preform 102 is porous. Examples of the ceramic preform 102 may include a three-dimensional weave of the ceramic fibers 104. Alternatively or in addition, the ceramic preform 102 may include a two-dimensional weave of the ceramic fibers 104. The ceramic preform 102 may include multiple layers of two-dimensional weave of the ceramic fibers 104. Alternatively or in addition, the ceramic preform 102 may include a fiber layup, such as a unidirectional layup.

In some examples, each of the ceramic fibers 104 may be a bundle and/or a tow of ceramic fibers. The fibers in each bundle or tow may be braided or otherwise arranged.

The ceramic fibers 104 may comprise a material that is stable at temperatures above 1000 degrees Celsius. Examples of the ceramic fibers 104 may include fibers of alumina, mullite, silicon carbide, zirconia or carbon. The ceramic fibers 104 may not be organic, metallic or glass fibers.

The monolithic rod 106 may be a piece of material that is longer than it is wide. The monolithic rod 106 may be in the form of a cylinder or any other regular or irregular shape that is longer than it is wide. The monolithic rod 106 may be rigid in some examples. The monolithic rod 106 may be monolithic in that it may be cast as a single piece, constitutes a single unit, and/or is seamless (in other words, includes no seams).

The monolithic rod 106 may be comprised of an environmental barrier coating material that is resistant to environmental attack. The environmental attack may be from oxygen, water vapor, or any other compound that may otherwise degrade the integrity or performance of a component that is coated by the environmental barrier coating material. The environmental barrier coating material may be based on a silicate, such as a rare earth silicate or other silicate. Examples of environmental barrier coating material may include a Ytterbium silicate, a Yttrium silicate, barium strontium aluminosilicate, and/or mullite. Examples of the monolithic rod 106 may include an EBC rod, a silicon carbide fiber, or any type of monolithic ceramic rod.

The monolithic rod 106 may be inserted into the ceramic preform 102. Inserting the monolithic rod 106 may include arranging the ceramic fibers 104 around the monolithic rod 106. Alternatively or in addition, inserting the monolithic rod 106 may include inserting the monolithic rod 106 into a prearrangement of the ceramic fibers 104. Alternatively or in addition, inserting the monolithic rod 106 may include arranging the monolithic rod 106 together with the ceramic fibers 104 into the ceramic preform 102. For example, the monolithic rod 106 may be woven together with the ceramic fibers 104.

Figure 2:
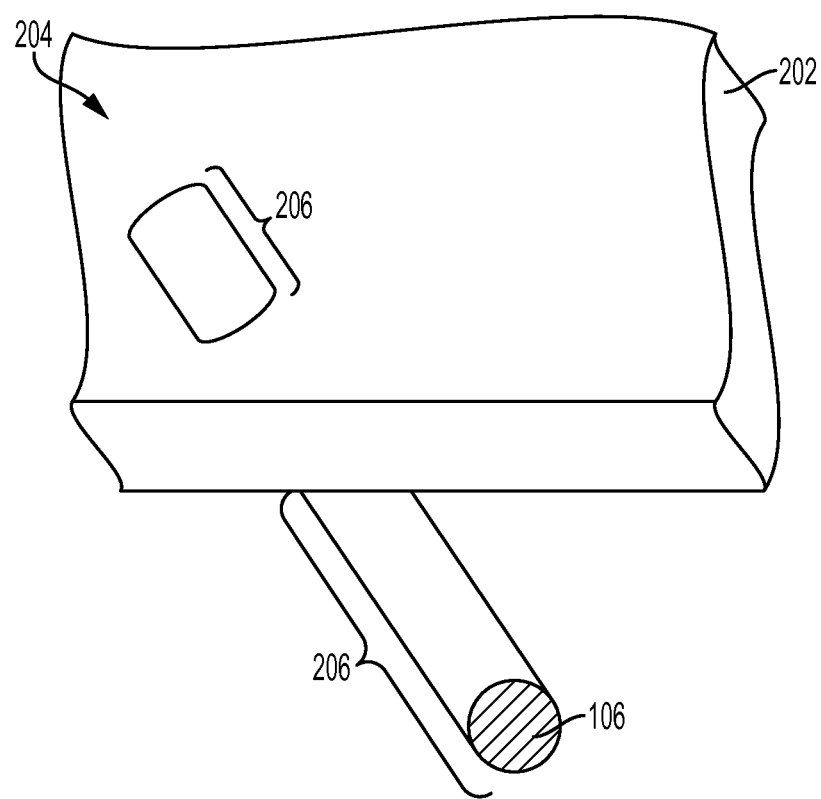
FIG. 2 illustrates a perspective view of a ceramic matrix composite body formed from a ceramic preform.

The ceramic preform 102, comprising the ceramic fibers 104 and the monolithic rod 106, may be formed into a ceramic matrix composite body. FIG. 2 illustrates an example of a ceramic matrix composite body 202 formed from the ceramic preform 102.

The ceramic matrix composite body 202 may be the CMC component in which a hole is to be formed. Alternatively, the ceramic matrix composite body 202 may be a component of the CMC component in which a hole is to be formed. The ceramic matrix composite body 202 may comprise, for example, a silicon carbide ceramic matrix composite. The ceramic matrix composite body 202 may have any shape or form, not just the shape illustrated in FIG. 2.

Forming the ceramic matrix composite body 202 from the ceramic preform 102 may include infiltrating a molten metal or alloy (for example, a silicon metal or alloy) into the ceramic preform 102. The silicon metal or alloy may fill gaps between the ceramic fibers 104 and the monolithic rod 106. The silicon metal or alloy may also react with a reactive element source present in the ceramic preform 102 to form additional silicon based ceramic matrix material. In some examples, a chemical vapor infiltration coating may be applied to the ceramic preform 102 prior to the melt infiltration to stiffen the ceramic fibers 104. Alternatively or in addition, forming the ceramic matrix composite body 202 from the ceramic preform 102 may include chemical vapor infiltrating the ceramic preform 102 instead of melt infiltrating a material into the ceramic preform 102.

The monolithic rod 106 may be embedded in the ceramic matrix composite body 202 at any angle with respect to an outer surface 204 of the ceramic matrix composite body 202. The monolithic rod 106 may extend partially or completely through the ceramic matrix composite body 202. In some examples, the monolithic rod 106 may curve or even wind through the ceramic matrix composite body 202.

Figure 3:
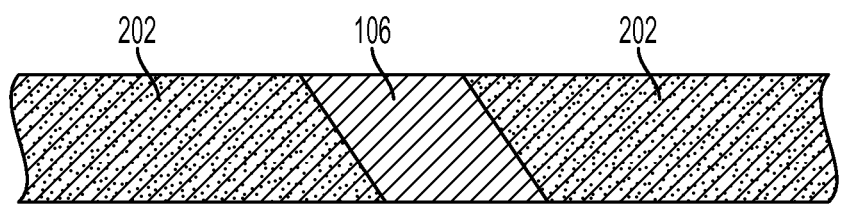
FIG. 3 illustrates a cross-sectional view of a ceramic matrix composite body in which a monolithic rod is embedded.

If the monolithic rod 106 extends outside of the ceramic matrix composite body 202, then the portion or portions 206 that extend outside of the ceramic matrix composite body 202 may be removed in some examples. The portions 206 that extend outside of the ceramic matrix composite body 202 may be machined off or otherwise removed. FIG. 3 illustrates a cross-sectional view of an example of the ceramic matrix composite body 202 that includes the monolithic rod 106 where no portion of the monolithic rod 106 extends beyond the ceramic matrix composite body 202. Alternatively, referring back to FIG. 2, the portions 206 that extend beyond an outer surface of the composite body 202 may remain and/or be partially removed.

Figure 4:
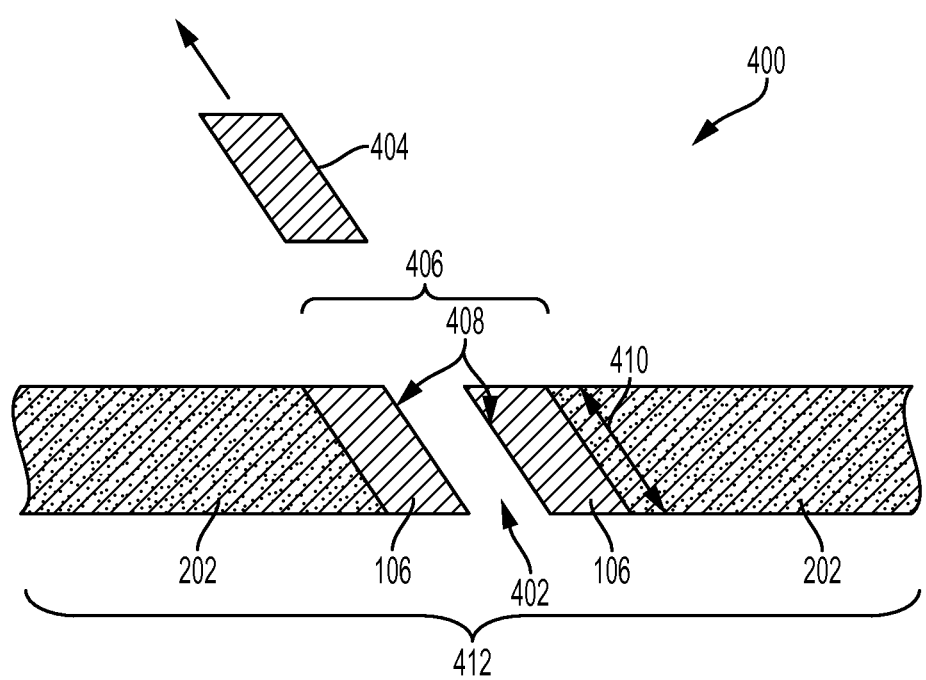
FIG. 4 illustrates a cross-sectional view of a ceramic matrix composite body comprising a monolithic rod having a hole.

FIG. 4 is a cross-sectional view of a ceramic matrix composite component 400, which comprises the ceramic matrix composite body 202 with a hole or an opening 402. To form the hole or the opening 402 in the ceramic matrix composite body 202, a first portion 404 of the monolithic rod 106 may be removed. A second portion 406 of the monolithic rod 106 may remain in the ceramic matrix composite body 202 after the first portion 404 is removed. The second portion 406 remaining in the ceramic matrix composite body 202 may include a wall 408 or walls that define the opening 402 in the ceramic matrix composite body 202.

The ceramic matrix composite component 400 may be any component in which one or more holes may be desired. For example, the ceramic matrix composite component 400 may be any component in which one or more holes are desired for fluid flow. Examples of the ceramic matrix composite component 400 may include, but are not limited to, any component of a gas turbine engine, such as an airfoil, a turbine blade, a vane, an endwall, and/or a seal segment.

The first portion 404 of the monolithic rod 106 may be removed by hole forming. Examples of hole forming may include mechanical drilling, electrical discharge machining, ultrasonic drilling, and/or laser drilling.

The first portion 404 of monolithic rod 106 may be removed after forming the ceramic matrix composite body 202. For example, the first portion 404 of the monolithic rod 106 may be removed prior to, during, or after machining the ceramic matrix composite body 202 or the ceramic matrix composite component 400.

An environmental barrier coating may be applied to the ceramic matrix composite body 202 before the first portion 404 of the monolithic rod 106 is removed. Alternatively, the environmental barrier coating may not be applied to the ceramic matrix composite body 202.

When completed, the ceramic matrix composite component 400 may include and/or be the ceramic matrix composite body 202. The ceramic matrix composite body 202 may include the second portion 406 of the monolithic rod 106, where the second portion 406 of the monolithic rod 106 in the ceramic matrix composite body 202 may be, or form, a lining around the opening 402. The opening 402 may pass partly or entirely through a length 410 of the monolithic rod 106. The portion 406 of the monolithic rod 106 remaining may be a hollow tube for example. The ceramic fibers 104 of the ceramic matrix composite body 202 may be uncut at the wall or the walls 408 of the opening 402.

The hole or the opening 402 in the ceramic matrix composite body 202 may be in a range of about 0.005 inches to about 0.050 inches in diameter. In some examples, the diameter of the hole or the opening 402 may be outside of the range of about 0.005 inches to about 0.050 inches. The opening 402 may be cylindrical or any other regular or irregular shape. A thickness of the lining around the opening 402, or the thickness of the second portion 406 remaining in the ceramic matrix composite body 202, may be in a range of about 0.001 inches to about 0.050 inches.

The opening 402 may be a passage for a thermal fluid. For example, the opening 402 may be a passage for air.

If the ceramic matrix composite body 202 or the ceramic matrix composite component 400 is an airfoil, such as a turbine blade or vane, the ceramic matrix composite body 202 may be subject to high temperatures. Subjecting one portion of a span 412 of the ceramic matrix composite body 202 to high temperatures may cause a temperature gradient across the span 412 of the ceramic matrix composite body 202. The temperature gradient may cause damage to the ceramic matrix composite body 202 that is sometimes catastrophic. The opening 402 may be a cooling hole. For example, air may be forced through the opening 402 thereby cooling the ceramic matrix composite body 202 around the opening 402. Therefore, forcing air through the opening 402 may reduce the temperature gradient across the span 412 of the ceramic matrix composite body 202.

The examples illustrated in FIGS. 1-4 include just one monolithic rod, and in FIG. 4, only one hole. However, the same technique may be used to form two or more holes in the ceramic matrix composite body 202. For example, multiple monolithic rods may be inserted into the ceramic preform 102. A portion of each of the monolithic rods may be removed after the ceramic matrix composite body 202 is formed, leaving a remaining portion of each of the monolithic rods in place in the ceramic matrix composite body 202. Each one of the portions left behind may form a lining of a corresponding hole.

Figure 5:
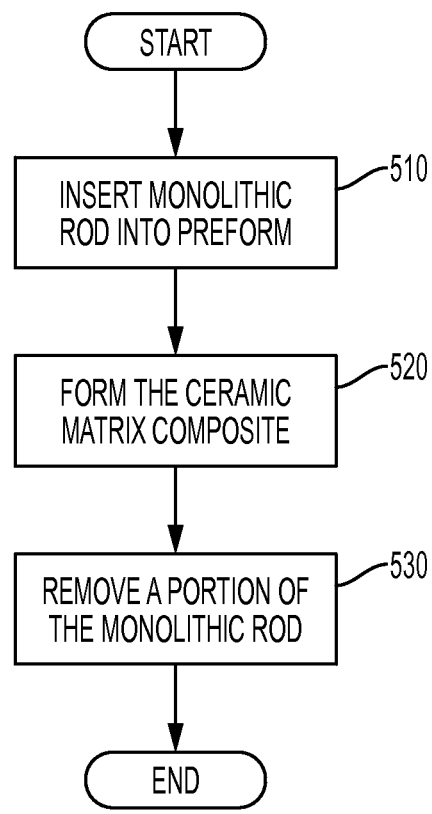
FIG. 5 illustrates a flow diagram of an example method to form a hole in a ceramic matrix composite component.

FIG. 5 illustrates a flow diagram of an example method to form the opening 402 in the ceramic matrix composite component 400. The method may include additional, different, or fewer operations than illustrated in FIG. 5. The operations may be executed in a different order than illustrated in FIG. 5.

The monolithic rod 106 having the environmental barrier coating 108 may be inserted (510) into the porous ceramic preform 102 comprising the ceramic fibers 104.

The ceramic matrix composite component 400 may be formed (520) from the porous ceramic preform 102. For example, the ceramic matrix composite component 400 may be formed (520) from the ceramic preform 102 by melt infiltrating the porous ceramic preform 102.

The first portion 404 of the monolithic rod 106 may be removed (530), where the second portion 406 of the monolithic rod 106 remaining in the ceramic matrix composite body 202 after the first portion 404 is removed includes the wall or walls 408 that define the opening 402 in the ceramic matrix composite body 202. For example, the first portion 404 of the monolithic rod 106 may be removed (530) by drilling out the first portion 404 with a mechanical drill.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible.

Accordingly, the embodiments described herein are examples, not the only possible embodiments and implementations.

Furthermore, the advantages described above are not necessarily the only advantages, and it is not necessarily expected that all of the described advantages will be achieved with every embodiment.

What is claimed is:

1. A method to form a hole in a ceramic matrix composite component, the method comprising:
   inserting a monolithic rod into a porous ceramic preform comprising a plurality of ceramic fibers;
   forming the ceramic preform into a ceramic matrix composite body, the ceramic matrix composite body including the monolithic rod; and
   removing a first portion of the monolithic rod, wherein a second portion of the monolithic rod remaining in the ceramic matrix composite body after the first portion is removed includes walls that define an opening in the ceramic matrix composite body.

2. The method of claim 1, wherein the monolithic rod comprises a monolithic ceramic rod.

3. The method of claim 1, wherein inserting the monolithic rod comprises arranging the ceramic fibers around the monolithic rod.

4. The method of claim 1, wherein removing the first portion of the monolithic rod comprises drilling out the first portion of the monolithic rod with a mechanical drill.

5. The method of claim 1, wherein removing the first portion of the monolithic rod comprises removing the first portion of the monolithic rod by electrical discharge machining.

6. The method of claim 1, wherein removing the first portion of the monolithic rod comprises removing the first portion of the monolithic rod with a laser.

7. The method of claim 1, wherein removing the first portion of the monolithic rod comprises removing the first portion of the monolithic rod with an ultrasonic drill.

8. The method of claim 1, wherein the porous ceramic preform comprises a three-dimensional weave, and wherein inserting the monolithic rod comprises inserting the monolithic rod into the three-dimensional weave.

9. The method of claim 1, wherein the porous ceramic preform comprises a two-dimensional weave, and wherein inserting the monolithic rod comprises inserting the monolithic rod into the two-dimensional weave.

10. The method of claim 1, wherein the porous ceramic preform comprises a unidirectional layup, and wherein inserting the monolithic rod comprises inserting the monolithic rod into the unidirectional layup.

11. The method of claim 1, wherein the ceramic fibers in the porous ceramic preform are braided.

12. The method of claim 1, wherein forming the ceramic matrix composite body comprises infiltrating a molten metal or alloy into the porous ceramic preform.

13. The method of claim 1 further comprising applying an environmental barrier coating to the ceramic matrix composite body before removing the first portion of the monolithic rod.

14. The method of claim 1, wherein the ceramic matrix composite body comprises silicon carbide.

15. The method of claim 1, wherein the second portion of the monolithic rod remaining in the ceramic matrix composite body is a tube that forms a lining around the opening.

16. The method of claim 15, wherein a thickness of the lining is in a range of about 0.001 inches to about 0.050 inches.

17. The method of claim 1, wherein the ceramic matrix composite body is a component of a gas turbine engine.

18. The method of claim 1, wherein a diameter of the opening in the ceramic matrix composite body is in a range of about 0.005 inches to about 0.050 inches.

19. The method of claim 1, wherein the hole is a passage for a thermal fluid.

* * * * *

UNITED STATES PATENT AND TRADEMARK OFFICE
CERTIFICATE OF CORRECTION

PATENT NO. : 9,797,263 B2
APPLICATION NO. : 14/722093
DATED : October 24, 2017
INVENTOR(S) : Bruce Edward Varney and Ted Joseph Freeman Page 1 of 1

It is certified that error appears in the above-identified patent and that said Letters Patent is hereby corrected as shown below:

On the Title Page

In the Assignee item (73), list ROLLS-ROYCE NORTH AMERICAN TECHNOLOGIES INC., Indianapolis, IN (US) in addition to ROLLS-ROYCE CORPORATION.

Signed and Sealed this
Fourteenth Day of May, 2019

Andrei Iancu
*Director of the United States Patent and Trademark Office*